Patented June 5, 1928.

1,672,431

UNITED STATES PATENT OFFICE.

HERBERT SCHOTTE, OF BERLIN-WILMERSDORF, GERMANY, ASSIGNOR TO THE FIRM CHEMISCHE FABRIK AUF ACTIEN VORMALS E. SCHERING, OF BERLIN, GERMANY.

SYMMETRICAL DIARYLIZED GUANIDINE COMPOUNDS.

No Drawing. Application filed November 22, 1926, Serial No. 150,166, and in Germany November 30, 1925.

My invention refers to the production of guanidine compounds.

I have found that if a salt of an isothio carbamide is caused to act on an aryl amine in the proportion of at least two molecules of the aryl amine to one molecule of the carbamide, a symmetrical diarylized guanidine is formed, the second aryl nucleus not entering into combination with the nitrogen atom with which the first aryl nucleus is combined, but with the second primary amino group of the guanidine.

The new compounds thus obtained are useful for therapeutical purposes, quite especially in the form of salts which are readily soluble in water.

*Example 1.*—80 grams aniline are heated in the presence of a small quantity of water to 100–130° C. with 72 grams S-ethyl-isothiocarbamide hydrobromide (or with corresponding quantities of S-methyl-isothiocarbamide hydroiodide, or S-benzyl-isothiocarbamide hydrochloride, and so on) until the separation of mercaptan has come to an end. The reaction product is freed by extraction with ether from the surplus of aniline and the residue is rendered alkaline with caustic soda solution. From this residue the symmetric diphenyl guanidine

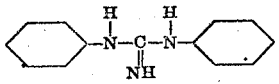

separates out in the form of prisms which dissolve in water only with great difficulty, but are readily soluble in alcohol and ether. The melting points is 148–149° C.

*Example 2.*—10.8 grams S-ethyl-isothiocarbamide hydrobromide are heated with 9 grams o-anisidine and a small quantity of water in the manner above described. The mass obtained, which has a red brown color, is freed from the o-anisidine in excess by means of ether and benzene. The symmetrical bis-(o-methoxy phenyl)-guanidine hydrobromide

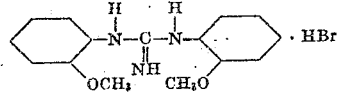

on being purified by dissolving in acetone or alcohol, melts at 195–196° C. From the watery solution the base is precipitated by means of an alkali in the form of an oil which ultimately solidifies and is soluble in water only with difficulty, while being readily soluble in organic solvents. When boiled with an alkali it is converted into the corresponding carbamide.

Various changes may be made in the details disclosed in the foregoing specification without departing from the invention or sacrificing the advantages thereof.

I claim:—

1. The method of making a symmetrical diaryl guanidine compound comprising causing a salt of an isothiocarbamide ether to react with an aryl amine in the proportion of at least two molecules of the aryl amine to one molecule of the ether.

2. The method of making symmetrical bis-(o-methoxyphenyl)-guanidine comprising causing a salt of S-ethyl-isothiocarbamide to act at a temperature of 100–150° C. in the presence of a small quantity of water on o-anisidine until no more mercaptan is developed, and precipitating with an alkali.

3. The method of making symmetrical bis-(o-methoxyphenyl)-guanidine comprising causing 10.8 parts by weight of S-ethyl-isothiocarbamide to act at 100–130° C. in the presence of some water on 9 parts o-anisidine, until no more mercaptan is developed, extracting with an organic solvent to remove the o-anisidine in excess, purifying by dissolution in an organic solvent and precipitating with an alkali.

In testimony whereof I affix my signature.

HERBERT SCHOTTE.